(12) United States Patent
Xu et al.

(10) Patent No.: US 12,502,387 B2
(45) Date of Patent: Dec. 23, 2025

(54) LURASIDONE SOLID DISPERSION AND PREPARATION METHOD THEREOF

(71) Applicant: SUNSHINE LAKE PHARMA CO., LTD., Guangdong (CN)

(72) Inventors: Yuzhen Xu, Dongguan (CN); Ni Wang, Dongguan (CN); Xin Huang, Dongguan (CN); Jinsong You, Dongguan (CN); Fangfang Huang, Dongguan (CN)

(73) Assignee: SUNSHINE LAKE PHARMA CO., LTD., Dongguan (CN)

( * ) Notice: Subject to any disclaimer, the term of this patent is extended or adjusted under 35 U.S.C. 154(b) by 705 days.

(21) Appl. No.: 16/771,164

(22) PCT Filed: Dec. 25, 2018

(86) PCT No.: PCT/CN2018/123502
§ 371 (c)(1),
(2) Date: Jun. 9, 2020

(87) PCT Pub. No.: WO2019/128991
PCT Pub. Date: Jul. 4, 2019

(65) Prior Publication Data
US 2021/0251985 A1    Aug. 19, 2021

(30) Foreign Application Priority Data
Dec. 26, 2017  (CN) .......................... 201711430382.1

(51) Int. Cl.
| | |
|---|---|
| *A61K 31/496* | (2006.01) |
| *A61K 31/44* | (2006.01) |
| *A61K 47/12* | (2006.01) |
| *A61K 47/26* | (2006.01) |
| *A61K 47/32* | (2006.01) |
| *A61K 47/38* | (2006.01) |

(52) U.S. Cl.
CPC ............ *A61K 31/496* (2013.01); *A61K 31/44* (2013.01); *A61K 47/12* (2013.01); *A61K 47/26* (2013.01); *A61K 47/32* (2013.01); *A61K 47/38* (2013.01)

(58) Field of Classification Search
None
See application file for complete search history.

(56) References Cited

U.S. PATENT DOCUMENTS

| | | | |
|---|---|---|---|
| 11,090,272 B2* | 8/2021 | Xu ......................... | A61P 25/18 |
| 2015/0157628 A1* | 6/2015 | Kannusamy ......... | A61K 9/2059 |
| | | | 514/254.04 |
| 2019/0321304 A1 | 10/2019 | Xu et al. | |

FOREIGN PATENT DOCUMENTS

| | | | |
|---|---|---|---|
| CN | 101702878 | * | 5/2010 |
| CN | 105395493 A | | 3/2016 |
| CN | 106539769 A | | 3/2017 |
| CN | 106539770 | * | 3/2017 |
| CN | 109939074 A | | 6/2019 |
| WO | WO 2009/017836 | * | 2/2009 |
| WO | 2011/085188 A1 | | 7/2011 |
| WO | 2014/076712 A2 | | 5/2014 |

OTHER PUBLICATIONS

Chatterji et al., CN 101702878, English machine translation obtained: Jan. 12, 2023. (Year: 2023).*
Jie et al. CN 106539770, English machine translation obtained on Dec. 12, 2024, published: Mar. 29, 2017. (Year: 2024).*
Mar. 29, 2019 International Search Report issued in International Patent Application No. PCT/CN2018/123502.
Mar. 29, 2019 Written Opinion of the International Searching Authority issued in International Patent Application No. PCT/CN2018/123502.

* cited by examiner

*Primary Examiner* — Genevieve S Alley
(74) *Attorney, Agent, or Firm* — Oliff PLC

(57) ABSTRACT

A lurasidone solid dispersion and a preparation method thereof. The solid dispersion includes a mixture of lurasidone, a pharmaceutical carrier and a plasticizer, in which the lurasidone is in a free base form. The lurasidone solid dispersion obtained by the preparation method has characteristics of high dissolution rate (over 30%) in partial neutral medium (such as pH 6.0), significantly increased bioavailability, and significantly reduced food effect, which overcomes the excessive medication limitation in the prior art, avoids the reduction or even inefficiency of the curative effect caused by improper medication of patients, ensures the normal exertion of the medication effect, thereby increases the flexibility and compliance of patients to take medicine.

16 Claims, 2 Drawing Sheets

LURASIDONE SOLID DISPERSION AND PREPARATION METHOD THEREOF

CROSS-REFERENCE TO RELATED APPLICATION

This application claims priority to Chinese Patent Serial No. 201711430382.1, filed on Dec. 26, 2017, which is hereby incorporated by reference in its entirety.

FIELD OF THE INVENTION

The invention relates to the medicine field, in particular to a lurasidone solid dispersion, a preparation method of the lurasidone solid dispersion, a pharmaceutical composition, and use of the pharmaceutical composition in the manufacture of a medicament.

BACKGROUND OF THE INVENTION

Lurasidone hydrochloride is an atypical antipsychotic drug, the lurasidone hydrochloride tablet with the trade name of LATUDA used for the treatment of schizophrenia developed by Dainippon Sumitomo Pharma Co., Ltd. was approved by the U.S. Food and Drug Administration (FDA) on Oct. 28, 2010.

The mechanism of action of lurasidone is mainly through acting on receptors such as central type 2 dopamine (D2) receptor and type 2 serotonin (5-HT2A) receptor, etc. lurasidone has significant efficacy for both positive and negative symptoms in psychotic patients, and lurasidone can also improve cognitive function.

However, currently available lurasidone tablets have lower bioavailability, and which must be administered together with food. The calories of the food must be greater than 350, otherwise the peak plasma concentration (Cmax) of lurasidone and the area under the curve of drug concentration-time (AUC) decrease 3-fold and 2-fold respectively, even though the bioavailability is only 9%-19%. The administration requirements of lurasidone for schizophrenia patients and depressed patients are more strict and harsh, usually the calories of normal diet are not be strictly calculated, and some patients would have symptoms of refusal to eat or loss of appetite; if the patients administer drug without eating enough food, the bioavailability of the drug may be led to decrease, the efficacy is affected, and the patient's condition is delayed.

Therefore, it is a key issue to be solved by drug developers to develop a dosage form which can reduce or eliminate food effects to improve patient compliance.

SUMMARY OF THE INVENTION

The purpose of the invention is to provide a pharmaceutical composition of lurasidone hydrochloride, which can reduce food effects to improve bioavailability and patient compliance.

In the first aspect of the invention, the present invention provides a lurasidone solid dispersion comprising lurasidone; the lurasidone is in a free base form.

In the second aspect of the invention, the present invention provides a method of preparing the lurasidone solid dispersion mentioned above. The method of preparing the lurasidone solid dispersion comprises melting a mixture of lurasidone, a pharmaceutical carrier and a plasticizer to obtain the lurasidone solid dispersion.

In the third aspect of the invention, the present invention provides a pharmaceutical composition. The pharmaceutical composition comprises the lurasidone solid dispersion, and the lurasidone solid dispersion is as defined above, or obtained by any one of the above methods.

In the fourth aspect of the invention, the present invention provides a combination, the combination is used for treating or preventing psychiosis, such as schizophrenia, bipolar depression and autism. The combination comprises: lurasidone as a first active ingredient and a drug other than lurasidone as a second active ingredient.

In the fifth aspect of the invention, the present invention provides use of the combination in the manufacture of a medicament for treating or preventing psychiosis, such as schizophrenia, bipolar depression and autism.

DETAILED DESCRIPTION OF THE INVENTION

The solubility of existing lurasidone hydrochloride has a strong pH-dependence, and it is higher in water and partial acidic medium, but it declines rapidly in a neutral medium. Most of the lurasidone dissolved or partially dissolved in the stomach is precipitated out while entering into the intestinal neutral pH environment, and only a small part of the lurasidone is dissolved and absorbed, thus resulting in lower bioavailability. At the same time, due to a small amount of drug is dissolved and absorbed in intestine, the solubilization effect is further enlarged caused by increase of food-induced gastrointestinal surfactants, resulting in severe food effect. Therefore, the inventors believed that it is possible to improve the bioavailability under fasting condition and then reduce its food effect, if the solubilization of lurasidone can be improved greatly. Based on the above, the present invention provides a method of preparing a lurasidone solid dispersion. The dissolution of lurasidone of the lurasidone solid dispersion prepared by the method increases greatly, and the bioavailability under fasting condition increases, the food effect reduces.

In the first aspect of the invention, the present invention provides a lurasidone solid dispersion comprising lurasidone; according to the embodiments of the invention, the lurasidone is in a free base form.

According to the embodiments of the invention, the lurasidone solid dispersion comprises lurasidone free base and a pharmaceutical carrier; according to the embodiments of the invention, wherein the pharmaceutical carrier comprises at least hydroxypropyl methylcellulose succinate acetate (HPMCAS).

According to the embodiments of the invention, the lurasidone solid dispersion comprises lurasidone free base and a plasticizer.

According to the embodiments of the invention, the lurasidone solid dispersion comprises lurasidone, a pharmaceutical carrier and a plasticizer, wherein the lurasidone is in a free base form, the pharmaceutical carrier comprises at least hydroxypropyl methylcellulose succinate acetate (HPMCAS).

It is well known that in order to improve the solubility, the common method is to prepare different salts of compounds. The solubility of free base or free acid is much lower than that of salt. The inventors found that the product prepared from free base of lurasidone had very low solubility and it cannot be dissolved in a neutral medium at all. The inventors surprisingly found that when lurasinone was supplied in a free base form having lower solubility, which combined with hydroxypropyl methylcellulose acetate succinate as carrier, or combined with a plasticizer, or combined with hydroxypropyl methylcellulose acetate succinate as carrier and a plasticizer to prepare a lurasidone solid dispersion, can greatly improve the dissolution of lusasidonein neutral medium, thus the oral bioavailability under fasting conditions was improved. According to the embodiments of the invention, the pharmaceutical carrier hydroxypropyl methylcellulose acetate succinate may make the drug have highly dispersive, good thermal stability and thermoplasticity, which is beneficial for the preparation of a solid dispersion, and can also inhibit the formation and growth of drug crystal nucleus and increase the dissolution of lurasidone. According to the embodiments of the invention, the above lurasidone solid dispersion further comprises at least one of the following additional technical features:

According to the embodiments of the invention, the hydroxypropyl methylcellulose acetate succinate comprises various types, such as LF, LG, MF, MG, HF and HG, etc., the first letters L, M and H of the type's names mean the pH level at the beginning of dissolution of HPMCAS, L refers to low level, HPMCAS begins to be dissolved when the pH value is more than 5.5, M refers to middle level, HPMCAS begins to be dissolved when the pH value is more than 6.0, H refers to high level, HPMCAS begins to be dissolved when the pH value is more than 6.5; the second letters F and G mean the particle size of HPMCAS, F refers to fine powder, G refers to granular. In some embodiments, the type of HPMCAS is LF; in some embodiments, the type of HPMCAS is MF; in some embodiments, the type of HPMCAS is HG.

According to the embodiments of the invention, the lurasidone and the hydroxypropyl methylcellulose succinate acetate have a weight ratio ranging from about 1:1 to about 1:30. The inventors found that when the pharmaceutical carrier was used too much, the weight ratio of the lurasidoneto the pharmaceutical carrier was more than 1:30, which led to the excessive weight or volume of the unit dose composition, the requirements of normal medication can not be met, which resulted in poor compliance of patients; when the pharmaceutical carrier was used less, the weight ratio of the lurasidoneto the pharmaceutical carrier was less than 1:1, which might lead to poor drug dispersion, and affect the quality of the formed solid dispersion, thus reduce the solubilization effect. In some embodiments, the lurasidone and the hydroxypropyl methylcellulose succinate acetate have a weight ratio ranging from about 1:1 to about 1:20; In some embodiments, the lurasidone and the hydroxypropyl methylcellulose succinate acetate have a weight ratio ranging from about 1:1 to about 1:15; In some embodiments, the lurasidone and the hydroxypropyl methylcellulose succinate acetate have a weight ratio ranging from about 1:15 to about 1:20; In some embodiments, the lurasidone and the hydroxypropyl methylcellulose succinate acetate have a weight ratio ranging from about 1:15 to about 1:30; In some embodiments, the lurasidone and the hydroxypropyl methylcellulose succinate acetate have a weight ratio ranging from about 1:20 to about 1:30; In some embodiments, the lurasidone and the hydroxypropyl methylcellulose succinate acetate have a weight ratio ranging from about 1:1 to about 1:4; In some embodiments, the lurasidone and the hydroxypropyl methylcellulose succinate acetate have a weight ratio ranging from about 1:4 to about 1:15; In some embodiments, the lurasidone and the hydroxypropyl methylcellulose succinate acetate have a weight ratio ranging from about 1:4 to about 1:20; In some embodiments, the lurasidone and the hydroxypropyl methylcellulose succinate acetate have a weight ratio ranging from about 1:4 to about 1:30, the solubilization effect was better, the unit volume composition has a suitable weight or volume. In some embodiments, the lurasidone and the hydroxypropyl methylcellulose succinate acetate have a weight ratio of about 1:1; In some embodiments, the lurasidone and the hydroxypropyl methylcellulose succinate acetate have a weight ratio of about 1:4; In some embodiments, the lurasidone and the hydroxypropyl methylcellulose succinate acetate have a weight ratio of about 1:14.9; In some embodiments, the lurasidone and the hydroxypropyl methylcellulose succinate acetate have a weight ratio of about 1:20; In some embodiments, the lurasidone and the hydroxypropyl methylcellulose succinate acetate have a weight ratio of about 1:28.

According to the embodiments of the invention, the pharmaceutical carrier may further comprises at least one selected from povidone, copovidone, polyvinyl caprolactam-polyvinyl acetate-polyethylene glycol graft copolymer (SOLUPLUS), polyethylene glycol, hydroxypropyl methyl cellulose, hydroxypropyl cellulose, ethyl cellulose and acrylic resin.

According to the embodiments of the invention, the pharmaceutical carrier comprises hydroxypropyl methylcellulose succinate acetate and at least one selected from povidone, copovidone, polyvinyl caprolactam-polyvinyl acetate-polyethylene glycol graft copolymer (SOLUPLUS), polyethylene glycol, hydroxypropyl methyl cellulose, hydroxypropyl cellulose, ethyl cellulose and acrylic resin. In some embodiments, the pharmaceutical carrier comprises hydroxypropyl methylcellulose succinate acetate and copovidone; In some embodiments, the pharmaceutical carrier comprises hydroxypropyl methylcellulose succinate acetate and SOLUPLUS; In some embodiments, the pharmaceutical carrier comprises hydroxypropyl methylcellulose succinate acetate, copovidone and SOLUPLUS.

According to the embodiments of the invention, the lurasidone solid dispersion is prepared by a melting method. Through experiments, the inventors found that the lurasidone solid dispersion described herein obtained by a melting method has a significantly improved dissolution of lurasidonein a neutral medium, the bioavailability was improved significantly, and the food effect was reduced significantly.

According to the embodiments of the invention, the plasticizer comprises at least one selected from poloxamer, propanediol, stearic acid, polyethylene glycol, tocopherol polyethylene glycol succinate, triethyl citrate, diethyl phthalate and glycerin monostearate. The inventors found that the plasticizer could greatly improve the dissolution of lurasidone of the lurasidone solid dispersion in a neutral medium, increase the feasibility of the hot melting process, and reduce the hot melting temperature and the torque of the hot melting process. In some embodiments, the plasticizer comprises stearic acid; in some embodiments, the plasticizer comprises poloxamer; in some embodiments, the plasticizer comprises tocopherol polyethylene glycol succinate; in some embodiments, the plasticizer comprises stearic acid and tocopherol polyethylene glycol succinate; in some embodiments, the plasticizer comprises stearic acid and poloxamer; in some embodiments, the plasticizer comprises propanediol.

According to the embodiments of the invention, the lurasidone and the plasticizer have a weight ratio ranging from about 1:0.1 to about 1:6. The inventors found that when the weight ratio of the lurasidone to the plasticizer was less than 1:6, the extrusion process and the granulation characteristics of an extrudate were affected, which made the extrudate difficult to be granulated. And also, the weight or volume of the unit dose formulation was too large to meet the requirements of normal medication, and the patient's medication compliance was decreased. In some embodiments, the lurasidone and the plasticizer have a weight ratio ranging from about 1:0.1 to about 1:0.3; In some embodiments, the lurasidone and the plasticizer have a weight ratio ranging from about 1:0.1 to about 1:1; In some embodiments, the lurasidone and the plasticizer have a weight ratio ranging from about 1:0.1 to about 1:1.5; In some embodiments, the lurasidone and the plasticizer have a weight ratio ranging from about 1:0.3 to about 1:1; In some embodiments, the lurasidone and the plasticizer have a weight ratio ranging from about 1:0.3 to about 1:1.5; In some embodiments, the lurasidone and the plasticizer have a weight ratio ranging from about 1:0.3 to about 1:6; In some embodiments, the lurasidone and the plasticizer have a weight ratio ranging from about 1:1 to about 1:1.5; In some embodiments, the lurasidone and the plasticizer have a weight ratio ranging from about 1:1 to about 1:6; In some embodiments, the lurasidone and the plasticizer have a weight ratio ranging from about 1:1.5 to about 1:6. In some embodiments, the lurasidone and the plasticizer have a weight ratio of about 1:0.2; In some embodiments, the lurasidone and the plasticizer have a weight ratio of about 1:0.3; In some embodiments, the lurasidone and the plasticizer have a weight ratio of about 1:0.42; In some embodiments, the lurasidone and the plasticizer have a weight ratio of about 1:1.1; In some embodiments, the lurasidone and the plasticizer have a weight ratio of about 1:1.62; In some embodiments, the lurasidone and the plasticizer have a weight ratio of about 1:5.

According to the embodiments of the invention, the lurasidone solid dispersion comprises lurasidone and hydroxypropyl methylcellulose succinate acetate; According to the embodiments of the invention, the lurasidone solid dispersion comprises lurasidone and stearic acid; According to the embodiments of the invention, the lurasidone solid dispersion comprises lurasidone, hydroxypropyl methylcellulose succinate acetate and stearic acid; According to the embodiments of the invention, the lurasidone solid dispersion comprises lurasidone, hydroxypropyl methylcellulose succinate acetate and poloxamer; According to the embodiments of the invention, the lurasidone solid dispersion comprises lurasidone, hydroxypropyl methylcellulose succinate acetate and tocopherol polyethylene glycol succinate. In some embodiments, the lurasidone solid dispersion consists of lurasidone, hydroxypropyl methylcellulose succinate acetate, stearic acid and copovidone; In some embodiments, the lurasidone solid dispersion consists of lurasidone, hydroxypropyl methylcellulose succinate acetate, stearic acid and SOLUPLUS; In some embodiments, the lurasidone solid dispersion consists of lurasidone, hydroxypropyl methylcellulose succinate acetate, stearic acid, poloxamer and SOLUPLUS; In some embodiments, the lurasidone solid dispersion consists of lurasidone, hydroxypropyl methylcellulose succinate acetate, stearic acid, copovidone and tocopherol polyethylene glycol succinate.

In the second aspect of the invention, the present invention provides a method of preparing the lurasidone solid dispersion mentioned above. According to the embodiments of the invention, the method of preparing the lurasidone solid dispersion comprises melting a mixture of lurasidone, a pharmaceutical carrier and a plasticizer to obtain the lurasidone solid dispersion.

According to the embodiments of the invention, the method of preparing the lurasidone solid dispersion comprises melting a mixture of lurasidone, a pharmaceutical carrier and a plasticizer to obtain the lurasidone solid dispersion, wherein the lurasidone is in a free base form, and the pharmaceutical carrier comprises at least hydroxypropyl methylcellulose succinate acetate.

According to the embodiments of the invention, the method of preparing the lurasidone solid dispersion comprises melting a mixture of lurasidone, a pharmaceutical carrier and a plasticizer to obtain the lurasidone solid dispersion, wherein the lurasidone is in a free base form, the pharmaceutical carrier comprises at least hydroxypropyl methylcellulose succinate acetate, and may further comprises at least one selected from povidone, copovidone, polyvinyl caprolactam-polyvinyl acetate-polyethylene glycol graft copolymer, polyethylene glycol, hydroxypropyl methyl cellulose, hydroxypropyl cellulose, ethyl cellulose and acrylic resin.

According to the embodiments of the invention, the method of preparing the lurasidone solid dispersion comprises melting a mixture of lurasidone, a pharmaceutical carrier and a plasticizer to obtain the lurasidone solid dispersion, wherein the lurasidone is in a free base form, the pharmaceutical carrier comprises hydroxypropyl methylcellulose succinate acetate, and at least one of povidone, copovidone, polyvinyl caprolactam-polyvinyl acetate-polyethylene glycol graft copolymer (SOLUPLUS), polyethylene glycol, hydroxypropyl methyl cellulose, hydroxypropyl cellulose, ethyl cellulose and acrylic resin.

According to the embodiments of the invention, the method of preparing the lurasidone solid dispersion has advantages of less preparation steps, free solvent, simple operation, suitable for continuous production, high yield and easy industrialization. More importantly, the lurasidone solid dispersion obtained by the preparation method according to the embodiment of the present invention has characteristics of high dissolution rate (over 30%, or over 50%, or even over 70%) in a partial neutral medium (such as pH 6.0), significantly increased bioavailability, and significantly reduced food effect, which overcame the excessive medication limitation in the prior art, avoided the reduction or even inefficiency of the curative effect caused by improper medication of patients, ensured the normal exertion of the medication effect, thereby increased the flexibility and compliance of patients to take medicine.

According to the embodiments of the invention, the above method of preparing the lurasidonesolid dispersion further comprises at least one of the following additional technical features:

According to the embodiments of the invention, the lurasidone and the hydroxypropyl methylcellulose succinate acetate have a weight ratio ranging from about 1:1 to about 1:30. The inventors found that the weight ratio of the lurasidone to the pharmaceutical carrier was more than 1:30, which led to a higher proportion of the pharmaceutical carrier and an excessive weight or volume of the unit dose formulation, thus the requirements of normal medication cannot be met, resulting in poor compliance of patients; the weight ratio of the lurasidone to the pharmaceutical carrier was less than 1:1, which might lead to a lower proportion of the pharmaceutical carrier and poor drug dispersion, and the quality of the formed solid dispersion was affected, thus the solubilization effect was reduced. In other embodiments, the lurasidone and the pharmaceutical carrier other than hydroxypropyl methylcellulose succinate acetate have a weight ratio ranging from about 1:1 to about 1:20; In still other embodiments, when the lurasidone and the hydroxypropyl methylcellulose succinate acetate have a weight ratio ranging from about 1:1 to about 1:15, the solubilization effect was good, and the unit volume composition has a suitable weight or volume.

According to the embodiments of the invention, the plasticizer comprises at least one selected from poloxamer, propanediol, stearic acid, polyethylene glycol, tocopherol polyethylene glycol succinate, LABRASOL (a caprylocaproyl macrogolglyceride), triethyl citrate, diethyl phthalate and glycerin monostearate. The inventor found that the plasticizer can increase the feasibility of the hot melting process, and reduce the hot melting temperature and the torque of the hot melting process. The dissolution of the lurasidone in the lurasidone solid dispersion in a neutral medium will be further improved.

According to the embodiments of the invention, the lurasidone and the plasticizer have a weight ratio ranging from about 1:0.1 to about 1:6. The inventors found that when the weight ratio of the lurasidone to the plasticizer was less than 1:6, the extrusion process and the granulation characteristics of an extrudate were affected, which made the extrudate difficult to be granulated. And also, the weight or volume of the unit dose formulation was too large to meet the requirements of normal medication, and the patient's medication compliance was decreased.

According to the embodiments of the invention, the melting is carried out under a temperature from 80° C. to 200° C. and a screw speed from 30 to 1000 rpm. The selection of melting temperature and rotational speed is based on the type of the used pharmaceutical carrier. The melting carried out under a temperature from 80° C. to 200° C. and a screw speed from 30 to 1000 rpm may smoothly extrude the target mixture, the extrusion speed and yield can meet the requirements, and the solubilization effect of lurasidone is better. In some embodiments, the temperature of the melting is respectively 80° C., 115° C., 130° C., 140° C., 145° C., 155° C., 160° C., 165° C.; In some embodiments, the screw speed is respectively 50 rpm, 100 rpm.

According to the embodiments of the invention, the melting mainly comprises the following steps:
 a) sifting lurasidone, a pharmaceutical carrier and a plasticizer, and then blending them uniformity to obtain a mixture;
 b) adding the above mixture into a hot melt extruder, and extruding the mixture in strip or sheet form at a suitable temperature and a screw speed range after shearing, extruding and blending to obtain extrudate;
 c) cooling the extrudate, and then crushing and sifting to get particle or powder of the lurasidone solid dispersion.

In the third aspect of the invention, the present invention provides a pharmaceutical composition. According to the embodiments of the invention, the pharmaceutical composition comprises the lurasidone solid dispersion, and the lurasidone solid dispersion is as defined above, or obtained by any one of the above methods. The pharmaceutical composition according to the embodiments of the invention is advantageous to the absorption of lurasidone, and can ensure the increase of the dissolution of lurasidone in the small intestine without considering the effect of food on the absorption of lurasidone, thus the excessive medication restriction was reduced, the reduction or even inefficiency of the curative effect caused by improper medication was avoided, and the normal development of the medication effect was ensured, thereby the flexibility and compliance of patients in taking drugs were increased.

According to the embodiments of the invention, the above pharmaceutical composition further comprises at least one of the following additional technical features:

According to the embodiments of the invention, the pharmaceutical composition further comprises a pharmaceutically acceptable excipient. The pharmaceutically acceptable excipient can make the pharmaceutical composition present a certain dosage form, which is beneficial for patients to take or inject, and improving the bioavailability and stability of the drug.

According to the embodiments of the invention, the pharmaceutically acceptable excipient comprises at least one selected from a filler, a disintegrant, a flavouring agent, an binder, a surfactant and a lubricant.

Wherein, the selections of the filler, disintegrant, flavouring agent, binder, surfactant and lubricant are not subject to special restrictions, according to the embodiments of the invention, the filler comprises at least one selected from lactose, starch, microcrystalline cellulose, silicified microcrystalline cellulose, powdered cellulose, mannitol, dextrin, pre-gelatinized starch, corn starch, sorbitol, calcium sulfate, calcium hydrogen phosphorous and calcium carbonate. According to the embodiments of the invention, the disintegrant comprises at least one selected from crospovidone, croscarmellose sodium, sodium carboxymethyl starch, dry starch, low-substituted hydroxypropyl cellulose, microcrystalline cellulose and modified corn starch. According to the embodiments of the invention, the binder comprises at least one selected from starch, pre-gelatinized starch, sodium carboxymethylcellulose, hydroxypropyl cellulose, methyl cellulose, ethyl cellulose, hydroxypropylmethylcellulose, sucrose, gelatin, polyvinylpyrrolidone, microcrystalline cellulose and copovidone. According to the embodiments of the invention, the surfactant comprises at least one selected from sodium lauryl sulfate, quaternary ammonium compound, lecithin, fatty acid glycerides, sorbitan fatty acid ester and polysorbate. According to the embodiments of the invention, the flavouring agent comprises at least one selected from sucrose, sucralose, acesulfame, aspartame, stevioside, saccharin sodium and cyclamate. According to the embodiments of the invention, the lubricant comprises at least one selected from magnesium stearate, micropowder silicagel, stearic acid, talcum, glyceryl behenate, hydrogenated vegetable oil, wax, mineral oil, sodium stearyl fumarate and polyethylene glycol. According to the embodiments of the invention, the additional filler can improve the properties of the materials, regulate the compressibility and fluidity, improve the properties of the product in favor of the formation of the shape of the formulation, and make the preparation process more smoothly; the additional disintegrant can make the tablet disintegrate rapidly in vivo and make the drug to be dissolved and absorbed rapidly; the binder has a certain stickiness, some loose powders can form granules with certain size based on the stickiness to improve fluidity, and play a certain role in regulation of formulation disintegration and drug release; the additional surfactant can help the drug disperse and has a certain solubilizing effect; the flavouring agent can improve the taste of the drug in a specific dosage form, such as orally disintegrating tablets and suspensions, shielding the bad odor of the drug and improving the patient's compliance; the lubricant can reduce friction between the intergranular or tablet and punching die, which makes the pressure distribution uniform and the tableting easier.

According to the embodiments of the invention, the pharmaceutical composition is in a form of granule, tablet, capsule or enteric-coated formulation. As mentioned before, the dissolution of the pharmaceutical composition according to the embodiments of the present invention is significantly increased in the small intestine. The pharmaceutical compositions according to the embodiments of the present invention are granules, tablets, capsules or enteric-coated formulations, which is adapted to the characteristics of the pharmaceutical compositions according to the embodiments of the present invention and is conducive to further improve the bioavailability of the pharmaceutical compositions.

According to the embodiments of the invention, the pharmaceutical composition comprises the lurasidone solid dispersion and further comprises a pharmaceutically acceptable excipient. In some embodiments, the lurasidone solid dispersion comprises lurasidone, hydroxypropyl methylcellulose succinate acetate and stearic acid; the pharmaceutically acceptable excipient comprises microcrystalline cellulose; In some embodiments, the lurasidone solid dispersion consists of lurasidone, hydroxypropyl methylcellulose succinate acetate, stearic acid and copovidone; the pharmaceutically acceptable excipient consists of microcrystalline cellulose, crospovidone and magnesium stearate.

In the forth aspect of the invention, the present invention provides a combination, the combination is used for treating or preventing psychiosis, such as schizophrenia, bipolar depression and autism. According to the embodiments of the invention, the combination comprises: lurasidone as a first active ingredient and a drug other than lurasidone as a second active ingredient; the lurasidone is in a form of a lurasidone solid dispersion, the lurasidone solid dispersion is as defined above, or the lurasidone solid dispersion is obtained by any one of the above methods; the drug other than lurasidone is as a second active ingredient, the drug other than lurasidone is used for treating or preventing psychiosis. The combination according to the embodiment of the present invention has remarkable therapeutic or preventive effects on psychiosis, and the flexibility and compliance of patients in taking drugs are significantly improved.

In the fifth aspect of the invention, the present invention provides use of the combination in the manufacture of a medicament for treating or preventing psychiosis, such as schizophrenia, bipolar depression and autism. As mentioned before, the pharmaceutical composition of the present invention has characteristics of high dissolution rate in a neutral medium. and high bioavailability The pharmaceutical composition of the present invention can treat or prevent psychiosis effectively, such as at least one of schizophrenia, bipolar depression and autism, and the food effect of the medicine is low, which avoids the side effects of reduced curative effect or even ineffective caused by improper medication, and ensures the normal exertion of the medicinal effect.

DEFINITION OF TERMS

The invention is intended to cover all alternatives, modifications, and equivalents which may be included within the scope of the present invention as defined by the claims. One skilled in the art will recognize many methods and materials similar or equivalent to those described herein, which could be used in the practice of the present invention. The present invention is in no way limited to the methods and materials described herein. In the event that one or more of the incorporated literature, patents, and similar materials differs from or contradicts this application, including but not limited to defined terms, term usage, described techniques, or the like, this application controls.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

Unless defined otherwise, all technical and scientific terms used herein have the same meaning as is commonly understood by one skilled in the art to which this invention belongs. All patents and publications referred to herein are incorporated by reference in their entirety.

The term "comprising" or "comprise" is meant to be open ended, including the indicated component but not excluding other elements.

In the above description, all numbers disclosed herein are approximate values, regardless whether the word "about" is used in connection therewith. The value of each number may differ by below 10% or 1%, 2%, 3%, 4% or 5% reasonable for the persons skilled in the art.

LC-MS-MS refers to liquid chromatography-mass spectrometry, XRD refers to X ray diffraction.

HPMCAS refers to hydroxypropyl methylcellulose succinate acetate, SOLUPLUS refers to polyvinyl caprolactam-polyvinyl acetate-polyethylene glycol graft copolymer.

AUC refers to area under blood concentration-time curve, Cmax refers to peak concentration.

M refers to mole, min refers to minute(s), ° C. refers to degree Celsius, mg refers to milligram, mL refers to millilitre, rpm refers to rotations per minute.

EXAMPLES

Figure 1:
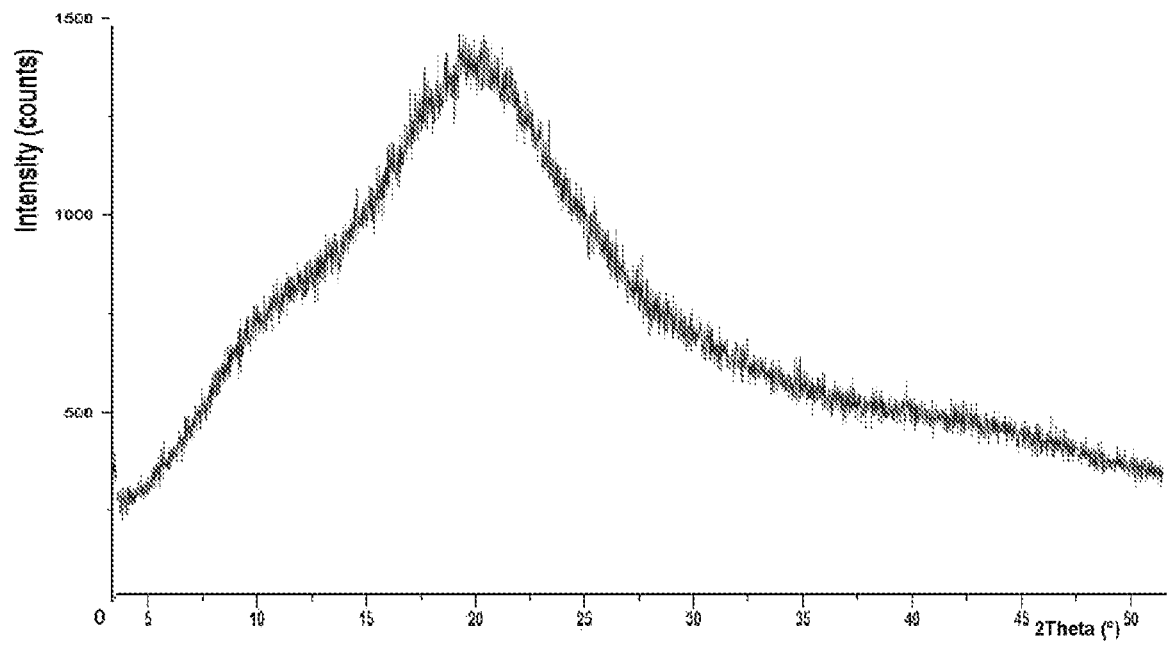
FIG. 1 shows the XRD test results of the hot melt powder of example 15 of the present invention.

Examples of the present invention are described in detail below. The embodiments described below are exemplary, which are merely to explain the present invention, but not to limit the scope of the present invention. In test methods without specific conditions in the embodiments, the conditions described in the references in this art or the conditions recommended by the product specification are generally used. The reagents or instruments used herein without marking the manufacturer all are conventional products purchased through the market.

In previous study, the inventors found that the reference formulation could be dissolved 100% in 0.1 M hydrochloric acid or pH 3.8 medium, but the bioavailability of the reference formulation after feeding was only 9%-19% and the bioavailability was less than 12% in animals. It can be seen that the two mediums just only represent the gastric environment under fasting condition or of some people under feeding condition, but cannot represent the environment of small intestine. And lurasidone is absorbed mainly in small intestine, the solubility of lurasidone has strong pH dependence, the solubility is better in water or acidic medium, but it decreases rapidly in neutral medium. Therefore, neither of the two media (0.1 M HCl and pH 3.8) can represent the environmental state of the drug in vivo.

The pH of upper segment of small intestine is about 6.0, so firstly the inventors chose 6.0 as the pH value of the dissolution medium.

The inventors found that the dissolution platform of the reference formulation was relatively low in the neutral medium, so there was a certain solubilization space. Patent application WO2014076712 A2 disclosed a method of lurasidone hydrochloride solid dispersion, a large number of organic solvents were needed in the method, and it is found that the solid dispersion prepared by the method can be dissolved in 0.1M hydrochloric acid or pH 3.8 medium, but the dissolution is not good in pH 6.0 medium, although the solubilization effect is increased compared with the reference formulation, it is far less than that of the solid dispersion of the present invention. Patent application US20140343076A1 disclosed a composition of lurasidone hydrochloride, which was prepared by mixing lurasidone, at least one acid, at least one surfactant and other excipient, and the solubilization effect of the composition prepared by the method is far less than that of the solid dispersion of the present invention in pH 6.0 medium. Patent application CN105395493A disclosed a lurasidone hydrochloride tablet, which was prepared by a method comprising heating melting potassium citrate and sorbitol, adding lurasidone hydrochloride, extruding, pelleting, adding excipient by an external addition, and tableting. This method has two melting steps, and the composition prepared by this method has a low dissolution platform in a neutral medium.

Comparative Example 1

TABLE 1

| | Components | Proportion (%) |
|---|---|---|
| Internal additional components | Lurasidone | 9.92 |
| | SOLUPLUS | 49.62 |
| | Stearic acid | 3.13 |
| External additional components | Microcrystalline cellulose | 31.33 |
| | Crospovidone XL | 5.00 |
| | Magnesium stearate | 1.00 |
| | Total | 100.00 |

The internal additional components were weighed according to the prescription listed in table 1, these components were mixed uniformly and added into the feeder of a hot melt extruder, the module temperatures were set to 80° C., 115° C., 145° C., 145° C., 145° C., 145° C., 145° C., 140° C., the screw speed was set to 50 rpm, and then hot-melt extruded, the extrudate was cooled and broken to pieces, the crushed extrudate was passed through a 60 mesh screen, the external additional components were added according to the prescription, and the resulting mixture was blended and tableted.

In this example, the dissolution tests in vitro of the tablets or powder prepared from the reference formulation (Lurasidone Hydrochloride Tablets, Sumitomo Japan, 40 mg Lurasidone Hydrochloride calculated), comparative Example 1, the following comparative examples 2-12, examples 1-5, example 9 and example 14 were carried out under conditions of pH 6.0 medium, 900±9 mL of medium, 37.0±0.5° C. of medium, by a paddle method with 50 rpm of screw speed. Pion Rainbow in-situ optical fiber was used for dissolution detection. The on-line optical fiber was installed into the dissolution cup, the height of the optical fiber probe was adjusted as the sampling needle port, and the optical fiber was shook gently to ensure there was no bubble in the optical path pool. Before addition of the sample, the background was deducted and the baseline was read to make the baseline "zero" and stable. Then the data acquisition program was set up and the sample was detected in real-time. Sampling time points were 5 min, 10 min, 15 min, 20 min, 30 min, 45 min, 60 min.

TABLE 2

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 1 | 0 ± 0.04 | 1 ± 0.12 | 1 ± 0.14 | 1 ± 0.15 | 2 ± 0.21 | 2 ± 0.36 | 3 ± 0.34 |

Comparative Example 1 has no solubilization in pH 6.0 medium compared with the reference formulation.

Comparative Example 2

TABLE 3

| | Components | Proportion (%) |
|---|---|---|
| Internal additional components | Lurasidone | 7.83 |
| | Copovidone VA64 | 15.67 |
| | HPMCAS-MF | 23.50 |
| External additional components | Microcrystalline cellulose | 47.00 |
| | Crospovidone XL | 5.00 |
| | Magnesium stearate | 1.00 |
| | Total | 100.00 |

The internal additional components were weighed according to the prescription listed in table 3, these components were mixed uniformly and added into the feeder of a hot melt extruder, the module temperatures were set to 110° C., 130° C., 165° C., 165° C., 165° C., 165° C., 165° C., 160° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 4

| Test number | 5 min | 10 min | 15 min | 20 min | 30 min | 45 min | 60 min |
|---|---|---|---|---|---|---|---|
| | dissolution in pH 6.0 medium | | | | | | |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 2 | 2 ± 1.24 | 4 ± 1.35 | 5 ± 1.16 | 6 ± 1.23 | 8 ± 1.11 | 11 ± 1.08 | 14 ± 0.40 |

Comparative Example 2 has a weaker solubilization in pH 6.0 medium compared with the reference formulation.

Comparative Example 3

TABLE 5

| | Components | Proportion (%) |
|---|---|---|
| Internal additional components | Lurasidone | 7.84 |
| | SOLUPLUS | 19.58 |
| | HPMCAS-MF | 19.58 |
| External additional components | Microcrystalline cellulose | 47.00 |
| | Crospovidone xl | 5.00 |
| | Magnesium stearate | 1.00 |
| | Total | 100.00 |

The internal additional components were weighed according to the prescription listed in table 5, these components were mixed uniformly and added into the feeder of a hot melt extruder, the module temperatures were set to 110° C., 130° C., 165° C., 165° C., 165° C., 165° C., 165° C., 160° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 6

| Test number | 5 min | 10 min | 15 min | 20 min | 30 min | 45 min | 60 min |
|---|---|---|---|---|---|---|---|
| | dissolution in pH 6.0 medium | | | | | | |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 3 | 2 ± 1.21 | 3 ± 1.09 | 5 ± 1.19 | 6 ± 1.14 | 8 ± 0.98 | 10 ± 0.92 | 12 ± 0.87 |

Comparative Example 3 has a weaker solubilization in pH 6.0 medium compared with the reference formulation.

Comparative Example 4

TABLE 7

| | Components | Proportion (%) |
|---|---|---|
| Internal additional components | Lurasidone | 7.45 |
| | Copovidone va64 | 33.52 |
| | Hpmcas-mf | 3.72 |
| | Stearic acid | 2.35 |

TABLE 7-continued

| | Components | Proportion (%) |
|---|---|---|
| External additional components | Microcrystalline cellulose | 46.96 |
| | Crospovidone xl | 5.00 |
| | Magnesium stearate | 1.00 |
| | Total | 100.00 |

The internal additional components were weighed according to the prescription listed in table 7, these components were mixed uniformly and added into the feeder of a hot melt extruder, themodule temperatures were set to 110° C., 130° C., 165° C., 165° C., 165° C., 165° C., 165° C., 160° C., the screw speed was set to 150 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 8

| Test number | dissolution in pH 6.0 medium | | | | | | |
|---|---|---|---|---|---|---|---|
| | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 4 | 11 ± 2.15 | 17 ± 0.75 | 19 ± 2.18 | 18 ± 3.32 | 19 ± 1.67 | 16 ± 3.34 | 16 ± 1.07 |

Comparative Example 4 has a weaker solubilization in pH 6.0 medium compared with the reference formulation.

Comparative Example 5

TABLE 9

| | Components | Proportion (%) |
|---|---|---|
| Internal additional components | Lurasidone | 12.41 |
| | SOLUPLUS | 37.24 |
| | TWEEN 80 (polyoxyethylene (20) sorbitan monooleate) | 2.62 |

TABLE 9-continued

| | Components | Proportion (%) |
|---|---|---|
| External additional component | Microcrystalline cellulose | 41.73 |
| | Crospovidone xl | 5.00 |
| | Magnesium stearate | 1.00 |
| Total | | 100.00 |

The internal additional components were weighed according to the prescription listed in table 9, these components were mixed uniformly and added into the feeder of a hot melt extruder, the module temperatures were set to 110° C., 130° C., 160° C., 160° C., 160° C., 160° C., 160° C., 155° C., the screw speed was set to 200 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 10

| Test number | dissolution in pH 6.0 medium | | | | | | |
|---|---|---|---|---|---|---|---|
| | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 5 | 6 ± 0.11 | 9 ± 0.17 | 11 ± 0.11 | 12 ± 0.14 | 12 ± 0.17 | 12 ± 0.17 | 10 ± 0.07 |

Comparative Example 5 has a weaker solubilization in pH 6.0 medium compared with the reference formulation.

Comparative Example 6

TABLE 11

| Components | Proportion (%) |
|---|---|
| Lurasidone | 25.00 |
| Microcrystalline cellulose | 75.00 |
| Total | 100.00 |

The components were weighed according to the prescription listed in table 11 and mixed uniformly

TABLE 12

| Test number | dissolution in pH 6.0 medium | | | | | | |
|---|---|---|---|---|---|---|---|
| | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 6 | 0 ± 0.00 | 0 ± 0.00 | 0 ± 0.00 | 0 ± 0.00 | 0 ± 0.00 | 0 ± 0.00 | 0 ± 0.00 |

Lurasidone free base of comparative example 6 was not performed any treatment on, and it could not be dissolved basically in the medium of pH 6.0 compared with the reference formulation, the dissolution of which was worse than that of the reference formulation.

Comparative Example 7 patent application CN105395493A

The specific prescription in patent application CN105395493A was showed in table 13.

TABLE 13

| Components | | Proportion (%) |
|---|---|---|
| Internal additional components | Lurasidone hydrochloride | 9.26 |
| | Potassium citrate | 9.26 |
| | Sorbitol | 27.78 |

TABLE 13-continued

| Components | | Proportion (%) |
|---|---|---|
| External additional components | Calcium hydrogen phosphorous | 50.93 |
| | Micropowder silicagel | 2.31 |
| | Magnesium stearate | 0.46 |
| Total | | 100.00 |

Potassium citrate and sorbitol were heated and melted, and then lurasidone hydrochloride was added to be melted, after the mixture was cooled, the external additional components were added, which were blended and triturated, the resulting mixture was sifted and filled into capsules.

TABLE 14

| dissolution in pH 6.0 medium | | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 7 | — | 0 ± 0.04 | 1 ± 0.11 | 1 ± 0.07 | 1 ± 0.11 | 1 ± 0.10 | 1 ± 0.03 |

Comparative Example 7 has no solubilization in pH 6.0 medium compared with the reference formulation.

Comparative Example 8 patent application WO2014076712A2

The specific prescription in patent application WO2014076712A2 was showed in table 15.

TABLE 15

| Components | Proportion (%) |
|---|---|
| Lurasidone hydrochloride | 25.00 |
| Copovidone | 75.00 |
| Methanol | 100 ml (be removed finally) |
| DCM | 100 ml (be removed finally) |
| Total | 100.00 |

Lurasidone hydrochloride and copovidone were weighed according to the prescription, and which were dissolved in a mixed solvent of methanol and dichloromethane (V:V=1:1, 200 mL), after the drug and the carriers were dissolved completely, the solution was spray-dried at 60-65° C. to get spray dried powder, which was filled into capsules directly.

TABLE 16

| dissolution in pH 6.0 medium | | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 8 | — | 1 ± 0.17 | 3 ± 1.25 | 5 ± 2.97 | 6 ± 1.15 | 7 ± 1.02 | 7 ± 0.30 |

Comparative Example 8 has no solubilization in pH 6.0 medium compared with the reference formulation.

Comparative Example 9

TABLE 17

| | Components | Proportion (%) |
|---|---|---|
| Internal additional components | Lurasidone hydrochloride | 8.00 |
| | SOLUPLUS | 20.00 |
| | HPMCAS-MF | 20.00 |
| | Stearic acid | 2.53 |
| External additional components | Microcrystalline cellulose | 43.47 |
| | Low-substituted hydroxypropyl cellulose | 5.00 |
| | Magnesium stearate | 1.00 |
| | Total | 100.00 |

The internal additional components were weighed according to the prescription listed in table 17, these components were mixed uniformly and added into the feeder of a hot melt extruder, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 18

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 9 | 1 ± 0.24 | 2 ± 0.14 | 3 ± 0.05 | 4 ± 0.14 | 5 ± 0.14 | 5 ± 0.12 | 5 ± 0.24 |

The sample prepared by hot-melt extrusion of lurasidone hydrochloride in comparative example 9 compared with the reference formulation has a zero difference dissolution in pH 6.0 medium, the dissolution amount is very limited, and the hot melt solid dispersion prepared by lurasidone hydrochloride cannot achieve solubilization effect.

Comparative Example 10

TABLE 19

| | Components | Proportion (%) |
|---|---|---|
| Internal additional components | Lurasidone hydrochloride | 8.00 |
| | SOLUPLUS | 20.00 |
| | HPMCAS-MF | 20.00 |
| | Poloxamer P188 | 2.53 |

TABLE 19-continued

| | Components | Proportion (%) |
|---|---|---|
| External additional components | Microcrystalline cellulose | 43.47 |
| | Low-substituted hydroxypropyl cellulose | 5.00 |
| | Magnesium stearate | 1.00 |
| | Total | 100.00 |

The internal additional components were weighed according to the prescription listed in table 19, these components were mixed uniformly and added into the feeder of a hot melt extruder, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 20

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 10 | 3 ± 0.27 | 5 ± 0.14 | 10 ± 0.29 | 12 ± 0.17 | 13 ± 0.79 | 11 ± 0.40 | 10 ± 1.22 |

The dissolution of the sample prepared by hot-melt extrusion of lurasidone hydrochloride in comparative example 10 compared with the reference formulation in pH 6.0 medium was increased slightly, and the solubilization effect of the hot melt solid dispersion prepared by lurasidone hydrochloride is very limited.

Comparative Example 11

TABLE 21

|  | Components | Proportion (%) |
|---|---|---|
| Internal additional components | Lurasidone hydrochloride | 8.00 |
|  | Copovidone VA64 | 20.00 |
|  | HPMCAS-MF | 20.00 |
|  | Poloxamer P188 | 2.53 |
| External additional components | Microcrystalline cellulose | 43.47 |
|  | Low-substituted hydroxypropyl cellulose | 5.00 |
|  | Magnesium stearate | 1.00 |
|  | Total | 100.00 |

The internal additional components were weighed according to the prescription listed in table 21, these components were mixed uniformly and added into the feeder of a hot melt extruder, and then hot-melt extruded, the extrudate was cooled and broken to pieces, the crushed extrudate was passed through a 60 mesh screen, the external additional components were added according to the prescription, and the resulting mixture was mixed and tableted.

TABLE 22

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 10 | 8 ± 0.28 | 12 ± 0.27 | 12 ± 0.52 | 12 ± 0.82 | 10 ± 1.06 | 10 ± 0.38 | 8 ± 0.45 |

The dissolution of the sample prepared by hot-melt extrusion of lurasidone hydrochloride in comparative example 11 compared with the reference formulation in pH 6.0 medium was increased slightly, and the solubilization effect of the hot melt solid dispersion prepared by lurasidone hydrochloride is very limited.

Comparative Example 12

TABLE 23

|  | Components | Proportion (%) |
|---|---|---|
| Internal additional components | Lurasidone hydrochloride | 8.00 |
|  | SOLUPLUS | 20.00 |
|  | HPMCAS-MF | 20.00 |
|  | Poloxamer P188 | 2.53 |
| External additional components | Microcrystalline cellulose | 43.47 |
|  | Low-substituted hydroxypropyl cellulose | 5.00 |
|  | Magnesium stearate | 1.00 |
|  | Total | 100.00 |

The internal additional components were weighed according to the prescription listed in table 23, the internal additional components were all dissolved in methanol, the solution was spray-dried to prepare an amorphous solid dispersion, and the external additional components were added according to the prescription, and the mixture was blended and tableted.

TABLE 24

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative Example 12 | 15 ± 0.52 | 16 ± 0.90 | 16 ± 0.49 | 17 ± 0.15 | 16 ± 0.22 | 15 ± 1.25 | 15 ± 1.87 |

The dissolution of the amorphous solid dispersion prepared by spray-drying of lurasidone hydrochloride in comparative example 12 compared with the reference formulation in pH 6.0 medium was increased slightly, and the solubilization effect of the dispersion prepared by spray drying of lurasidone hydrochloride is very limited.

The preparation embodiments of the present invention will be described in detail below. The preparation process of the pharmaceutical composition of the present invention is summarized as follows:

1. sifting lurasidone, a pharmaceutical carrier and a plasticizer, and then blending them uniformity to obtain a physical mixture;
2. adding the above physical mixture into a hot melt extruder, and extruding the physical mixture in strip or sheet form at a suitable temperature and a screw speed range after shearing, extruding and blending to obtain extrudate;
3. cooling the extrudate, and then crushing and sifting to get particle or powder of a lurasidone solid dispersion;
4. blending the lurasidone solid dispersion granular or powder with pharmaceutically acceptable excipient uiniformly to prepare oral drug formulations for clinical use, such as granules, tablets, capsules, etc., also including enteric-coated preparations, such as tablets coated with enteric-coated or enteric capsule shells.

The specific preparation process is described in examples 1-14.

Example 1

TABLE 25 the investigation of the effect of HPMCAS in the compositions

| | Components | Comparative example 1 | Comparative example 5 | Prescription 1 | Prescription 2 |
|---|---|---|---|---|---|
| Internal additional components | Lurasidone | 9.92 | 12.41 | 9.92 | 9.92 |
| | SOLUPLUS | 49.62 | 37.24 | — | 24.81 |
| | HPMCAS-LF | — | — | 49.62 | 24.81 |
| | Stearic acid | 3.13 | — | 3.13 | 3.13 |
| | TWEEN 80 | — | 2.62 | — | — |
| External additional components | Microcrystalline cellulose | 31.33 | 41.73 | 31.33 | 31.33 |
| | Crospovidone XL | 5.00 | 5.00 | 5.00 | — |
| | Croscarmellose sodium | — | — | — | 5.00 |
| | Magnesium stearate | 1.00 | 1.00 | 1.00 | 1.00 |
| | Total | 100.00 | 100.00 | 100.00 | 100.00 |

Prescriptions 1, 2: the internal additional components were weighed according to the prescription listed in table 25, these components were mixed uniformly and added into the feeder of a hot melt extruder, the module temperatures were set to 80° C., 115° C., 145° C., 145° C., 145° C., 145° C., 145° C., 140° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was mixed and tableted.

TABLE 26 dissolution in pH 6.0 medium

| Test number | 5 min | 10 min | 15 min | 20 min | 30 min | 45 min | 60 min |
|---|---|---|---|---|---|---|---|
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative example 1 | 0 ± 0.04 | 1 ± 0.12 | 1 ± 0.14 | 1 ± 0.15 | 2 ± 0.21 | 2 ± 0.36 | 3 ± 0.34 |
| Comparative example 5 | 6 ± 0.11 | 9 ± 0.17 | 11 ± 0.11 | 12 ± 0.14 | 12 ± 0.17 | 12 ± 0.17 | 10 ± 0.07 |
| Prescription 1 | 8 ± 0.32 | 14 ± 0.62 | 19 ± 0.85 | 22 ± 1.19 | 27 ± 1.65 | 31 ± 1.73 | 33 ± 1.76 |
| Prescription 2 | 13 ± 0.81 | 36 ± 1.87 | 44 ± 2.19 | 48 ± 2.13 | 47 ± 1.97 | 44 ± 1.95 | 39 ± 1.39 |

In the prescriptions of comparative example 1 and comparative example 5, pure SOLUPLUS was used as a hot melt carrier, and no HPMCAS was found. Compared with the dissolution of the reference formulation in the medium of pH 6.0, the dissolution of comparative example 1 has no solubilization, and comparative example 5 has a weaker solubilization; but prescriptions 1 and 2 containing HPMCAS was obvious solubilization, and the dissolution was more than 30% in 60 minutes.

Example 2

|  | | Proportion (%) | | | | | | |
|---|---|---|---|---|---|---|---|---|
| Components | | Comparative example 4 | Prescription 3 | Prescription 4 | Prescription 5 | Prescription 6 | Prescription 7 | Prescription 8 |
| Internal additional components | Lurasidone | 7.45 | 7.45 | 11.88 | 7.44 | 1.54 | 1.16 | 0.80 |
| | SOLUPLUS | — | — | 17.81 | — | — | — | — |
| | Copovidone VA64 | 33.52 | 29.79 | — | 7.44 | 22.98 | 23.17 | 22.60 |
| | HPMCAS-MF | 3.72 | 7.45 | 17.81 | 29.77 | 22.98 | 23.17 | 22.60 |
| | Stearic acid | 2.35 | 2.35 | 2.50 | 2.35 | 2.50 | 2.50 | — |
| | Poloxamer P188 | — | — | — | — | — | — | 4.00 |
| External additional components | Mannitol | — | 52.96 | 50.00 | — | — | — | 50.00 |
| | Microcrystalline cellulose | 46.96 | — | — | 47.00 | 50.00 | 50.00 | — |
| | Crospovidone XL | 5.00 | — | — | 5.00 | — | — | — |
| | Magnesium stearate | 1.00 | — | — | 1.00 | — | — | — |
| Total | | 100.00 | 100.00 | 100.00 | 100.00 | 100.00 | 100.00 | 100.00 |

Prescriptions 3, 6, 7: the internal additional components were weighed according to the prescription listed in table 27, these components were mixed uniformly and added into the feeder of a hot melt extruder, the module temperatures were set to 110° C., 130° C., 160° C., 160° C., 160° C., 160° C., 160° C., 155° C., the screw speed was set to 100 rpm, and then the mixture was hot-melt extruded, the extrudate was cooled and broken to pieces, the crushed extrudate was passed through a 60 mesh screen, the external additional components were added according to the prescription, and the resulting mixture was mixed and tableted.

Prescription 4: the internal additional components were weighed according to the prescription listed in table 27, these components were mixed uniformly and added into the feeder of a hot melt extruder, the module temperatures were set to 110° C., 130° C., 160° C., 160° C., 160° C., 160° C., 160° C., 155° C., the screw speed was set to 100 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Prescription 8: the internal additional components were weighed according to the prescription listed in table 27, these components were mixed uniformly and added into the feeder of a hot melt extruder, the module temperatures were set to 110° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended.

TABLE 28

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative example 4 | 11 ± 2.15 | 17 ± 0.75 | 19 ± 2.18 | 18 ± 3.32 | 19 ± 1.67 | 16 ± 3.34 | 16 ± 1.07 |
| Prescription 3 | 59 ± 1.71 | 61 ± 2.67 | 59 ± 3.78 | 59 ± 2.65 | 55 ± 2.20 | 50 ± 4.24 | 49 ± 2.35 |
| Prescription 4 | 2 ± 1.96 | 8 ± 1.09 | 40 ± 1.09 | 61 ± 0.78 | 73 ± 2.99 | 72 ± 7.70 | 67 ± 12.44 |
| Prescription 5 | 4 ± 0.62 | 15 ± 0.29 | 27 ± 0.22 | 37 ± 0.67 | 53 ± 1.90 | 68 ± 4.64 | 75 ± 6.71 |
| Prescription 6 | 54 ± 3.96 | 68 ± 3.57 | 70 ± 3.02 | 71 ± 2.64 | 72 ± 2.57 | 72 ± 2.77 | 72 ± 2.75 |
| Prescription 7 | 60 ± 0.01 | 73 ± 0.85 | 75 ± 0.63 | 76 ± 0.37 | 77 ± 0.07 | 75 ± 0.71 | 72 ± 0.26 |
| Prescription 8 | 15 ± 0.28 | 28 ± 2.83 | 52 ± 4.10 | 64 ± 2.83 | 73 ± 2.83 | 75 ± 3.54 | 78 ± 2.83 |

Prescription 5: the internal additional components were weighed according to the prescription listed in table 27, these components were mixed uniformly and added into the feeder of a hot melt extruder, the module temperatures were set to 110° C., 130° C., 165° C., 165° C., 165° C., 165° C., 165° C., 160° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended.

The weight ratio of lurasidone to HPMCAS in comparative example 4 was 1:0.5, compared with the dissolution of reference preparation in pH 6.0 medium, the solubilization effect of comparative example 4 was weaker; the weight ratios of lurasidone to HPMCAS in prescription 3/4/5/6/7/8 were 1:1, 1:1.5, 1:4, 1:14.9, 1:20 and 1:28 respectively. Compared with the dissolution of the reference formulation in pH 6.0 medium, the solubilization effect of prescription 3/4/5/6/7/8 were stronger, in which the maximum dissolution of prescription 3 was more than 50%, and the maximum dissolutions of prescription 4/5/6/7/8 were more than 70%. Therefore, the optimum weight ratio of lurasidone to HPMCAS is from 1:1 to 1:30, which has a strong solubilization effect; because the ratio carrier is too large, it will affect the subsequent preparation process and oral compliance of patients. More optimally, the weight ratio of lurasidone to HPMCAS is from 1:1 to 1:20; most optimally, the weight ratio of lurasidone to HPMCAS is from 1:1 to 1:15.

The types of HPMCAS in prescription Feb. 9, 2010 were L/M/H respectively, the solubilization effect was stronger compared with the dissolution of reference preparation in pH 6.0 medium, and the dissolution in 60 minutes was more than 30%. Therefore, different HPMCAS types had different solubilization effects on lurasidone solid dispersion Example 3

TABLE 29 the investigation of the effect of HPMCAS type in the compositions

| Components | | Proportion (%) | | |
|---|---|---|---|---|
| | | Prescription 2 | Prescription 9 | Prescription 10 |
| Internal additional components | Lurasidone | 9.92 | 7.44 | 5.94 |
| | SOLUPLUS | 24.81: | 18.61 | 20.78 |
| | HPMCAS-LF | 24.81 | — | — |
| | HPMCAS-MF | — | 18.60 | — |
| | HPMCAS-HG | — | — | 20.78 |
| | Stearic acid | 3.13 | 2.35 | 2.50 |
| External additional components | Microcrystalline cellulose | 31.33 | 47.00 | 50.00 |
| | Croscarmellose sodium | 5.00 | — | — |
| | Crospovidone XL | — | 5.00 | — |
| | Magnesium stearate | 1.00 | 1.00 | — |
| Total | | 100.00 | 100.00 | 100.00 |

Prescription 9: the internal additional components were weighed according to the prescription listed in table 29, these components were mixed uniformly and added into the feeder of a hot melt extruder, the module temperatures were set to 110° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Prescription 10: the internal additional components were weighed according to the prescription listed in table 29, these components were mixed uniformly and added into the feeder of a hot melt extruder, the module temperatures were set to 110° C., 130° C., 160° C., 160° C., 160° C., 160° C., 160° C., 155° C., the screw speed was set to 100 rpm, and then the mixture was hot-melt extruded, the extrudate was cooled and broken to pieces, the crushed extrudate was passed through a 60 mesh screen, the external additional components were added according to the prescription, and the resulting mixture was blended.

Example 4

TABLE 31 the investigation of the effect of plasticizer in the composition

| Components | | Proportion (%) | | | |
|---|---|---|---|---|---|
| | | Comparative example 2 | Prescription 11 | Prescription 12 | Prescription 13 |
| Internal additional components | Lurasidone | 7.83 | 12.19 | 7.44 | 11.56 |
| | Copovidone VA64 | 15.67 | 14.62 | 14.88 | 13.88 |
| | HPMCAS-MF | 23.50 | 21.94 | — | 20.81 |
| | HPMCAS-LF | — | — | 22.33 | — |
| | Stearic acid | — | — | 2.35 | 1.25 |
| | Tocopherol polyethylene glycol succinate | — | 1.25 | — | 2.50 |
| External additional components | Microcrystalline cellulose | 47.00 | 50.00 | 47.00 | 50.00 |
| | Crospovidone XL | 5.00 | — | 5.00 | — |
| | Magnesium stearate | 1.00 | — | 1.00 | — |
| Total | | 100.00 | 100.00 | 100.00 | 100.00 |

Prescriptions 11, 13: the internal additional components were weighed according to the prescription listed in table 31, these components were mixed uniformly and added into the feeder of a hot melt extruder, the module temperatures were set to 80° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended.

Prescription 12: the internal additional components were weighed according to the prescription listed in table 31, these components were mixed uniformly and added into the feeder of a hot melt extruder, the module temperatures were set to 110° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 30

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Prescription 2 | 13 ± 0.81 | 36 ± 1.87 | 44 ± 2.19 | 48 ± 2.13 | 47 ± 1.97 | 44 ± 1.95 | 39 ± 1.39 |
| Prescription 9 | 3 ± 0.10 | 7 ± 0.21 | 16 ± 1.30 | 30 ± 0.76 | 42 ± 2.00 | 46 ± 3.70 | 46 ± 2.79 |
| Prescription 10 | 3 ± 0.78 | 6 ± 0.44 | 9 ± 0.84 | 11 ± 1.55 | 14 ± 0.79 | 21 ± 1.36 | 41 ± 2.71 |

TABLE 32 dissolution in pH 6.0 medium

| Test number | 5 min | 10 min | 15 min | 20 min | 30 min | 45 min | 60 min |
|---|---|---|---|---|---|---|---|
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative example 2 | 2 ± 1.24 | 4 ± 1.35 | 5 ± 1.16 | 6 ± 1.23 | 8 ± 1.11 | 11 ± 1.08 | 14 ± 0.40 |
| Prescription 11 | 7 ± 0.13 | 18 ± 0.61 | 27 ± 0.74 | 32 ± 0.76 | 36 ± 0.97 | 34 ± 0.89 | 30 ± 0.70 |
| Prescription 12 | 38 ± 3.35 | 55 ± 3.27 | 60 ± 2.66 | 60 ± 2.22 | 61 ± 1.69 | 62 ± 1.17 | 62 ± 0.37 |
| Prescription 13 | 62 ± 1.44 | 70 ± 1.23 | 66 ± 1.54 | 61 ± 1.35 | 53 ± 1.20 | 46 ± 0.61 | 41 ± 1.08 |

The prescription of comparative example 2 without plasticizer has a weaker solubilization compared with the reference formulation in pH 6.0 medium; prescription Nov. 12, 2013 with plasticizer has a stronger solubilization compared with the reference formulation in pH 6.0 medium, wherein the dissolution of prescription 11/13 was more than 30% in 60 minutes, the dissolution of prescription 12 was more than 50% in 60 minutes, therefore, plasticizer in the prescription is beneficial for solubilization.

Example 5

TABLE 33 the investigation of the effect of plasticizer in the composition

| | | Proportion (%) | | | | |
|---|---|---|---|---|---|---|
| | Components | Comparative example 3 | Comparative example 9 | Prescription 4 | Prescription 14 | Prescription 15 |
| Internal additional components | Lurasidone | 7.84 | — | 11.88 | 7.44 | 2.26 |
| | Lurasidone hydrochloride | — | 8.00 | — | — | — |
| | SOLUPLUS | 19.58 | 20.00 | 17.81 | 18.61 | — |
| | Copovidone VA64 | — | — | — | — | 22.62 |
| | HPMCAS-MF | 19.58 | 20.00 | 17.81 | 18.60 | 22.62 |
| | Stearic acid | — | 2.53 | 2.50 | 1.17 | 2.50 |
| | Poloxamer P188 | — | — | — | 1.18 | — |
| External additional components | Microcrystalline cellulose | 47.00 | 43.47 | — | 47.00 | 50.00 |
| | Mannitol | — | — | 50.00 | — | — |
| | Crospovidone XL | 5.00 | — | — | 5.00 | — |
| | Low-substituted hydroxypropyl cellulose | — | 5.00 | — | — | — |
| | Magnesium stearate | 1.00 | 1.00 | — | 1.00 | — |
| Total | | 100.00 | 100.00 | 100.00 | 100.00 | 100.00 |

Prescription 14: the internal additional components were weighed according to the prescription listed in table 33, these components were mixed uniformly and added into the feeder of a hot melt extruder, the module temperatures were set to 110° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Prescriptions 15: the internal additional components were weighed according to the prescription listed in table 33, wherein the weight ratio of lurasidone to HPMCAS was 1:10, which were mixed uniformly and added into the feeder of a hot melt extruder, the module temperatures were set to 110° C., 130° C., 160° C., 160° C., 160° C., 160° C., 160° C., 155° C., the screw speed was set to 100 rpm, and the mixture was then hot-melt extruded, the extrudate was cooled and broken to pieces, the crushed extrudate was passed through a 60 mesh screen, the external additional components were added according to the prescription, and the resulting mixture was blended.

TABLE 34 dissolution in pH 6.0 medium

| Test number | 5 min | 10 min | 15 min | 20 min | 30 min | 45 min | 60 min |
|---|---|---|---|---|---|---|---|
| Reference formulation | 4 ± 0.81 | 5 ± 0.30 | 5 ± 0.19 | 5 ± 0.08 | 4 ± 0.06 | 4 ± 0.26 | 4 ± 0.07 |
| Comparative example 3 | 2 ± 1.21 | 3 ± 1.09 | 5 ± 1.19 | 6 ± 1.14 | 8 ± 0.98 | 10 ± 0.92 | 12 ± 0.87 |
| Comparative example 9 | 1 ± 0.24 | 2 ± 0.14 | 3 ± 0.05 | 4 ± 0.14 | 5 ± 0.14 | 5 ± 0.12 | 5 ± 0.24 |
| Prescription 4 | 2 ± 1.96 | 8 ± 1.09 | 40 ± 1.09 | 61 ± 0.78 | 73 ± 2.99 | 72 ± 7.70 | 67 ± 12.44 |

TABLE 34-continued

| | dissolution in pH 6.0 medium | | | | | | |
|---|---|---|---|---|---|---|---|
| Test number | 5 min | 10 min | 15 min | 20 min | 30 min | 45 min | 60 min |
| Prescription 14 | 3 ± 0.17 | 8 ± 0.06 | 29 ± 1.37 | 46 ± 3.94 | 61 ± 6.35 | 65 ± 6.55 | 65 ± 6.23 |
| Prescription 15 | 63 ± 4.16 | 76 ± 4.56 | 77 ± 4.75 | 77 ± 5.05 | 77 ± 5.04 | 77 ± 4.91 | 76 ± 4.76 |

The prescription of comparative example 3 without plasticizer has a weaker solubilization compared with the reference formulation in pH 6.0 medium; The dissolution of the solid dispersion prepared by hot melting of lurasidone hydrochloride, a pharmaceutical carrier and a plasticizer in pH 6.0 medium was only 5%, and there was no solubilization effect compared with the reference formulation. The dissolution of the prescription Apr. 14, 2015 with lurasidone free base, pharmaceutical carriers and various plasticizers was stronger in the medium of pH 6.0 compared with the reference formulation. Wherein the maximum dissolution of prescription 4 was more than 70%, the maximum dissolution of prescription 14 was more than 65%, and the dissolution of prescription 15 was more than 70% in 60 minutes. The solubilization effect was obviously better than that of the prescription prepared by lurasidone hydrochloride and without plasticizer.

Example 6

TABLE 35

| | Components | Proportion (%) |
|---|---|---|
| Internal additional components | Lurasidone | 9.92 |
| | SOLUPLUS | 29.77 |
| | HPMCAS-LF | 19.85 |
| | Propanediol | 3.13 |
| External additional components | Microcrystalline cellulose | 31.33 |
| | Crospovidone XL | 5.00 |
| | Magnesium stearate | 1.00 |
| | Total | 100.00 |

The internal additional components were weighed according to the prescription listed in table 35, these components were mixed uniformly and added into the feeder of a hot melt extruder, the module temperatures were set to 80° C., 110° C., 145° C., 145° C., 145° C., 145° C., 145° C., 140° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 7

TABLE 36

| | Components | Proportion (%) |
|---|---|---|
| Internal additional components | Lurasidone | 7.44 |
| | SOLUPLUS | 18.61 |
| | HPMCAS-MF | 18.60 |
| | Poloxamer P188 | 2.35 |

TABLE 36-continued

| | Components | Proportion (%) |
|---|---|---|
| External additional components | Microcrystalline cellulose | 47.00 |
| | Sodium carboxymethyl starch | 5.00 |
| | Magnesium stearate | 1.00 |
| | Total | 100.00 |

The internal additional components were weighed according to the prescription listed in table 36, these components were mixed uniformly and added into the feeder of a hot melt extruder, the module temperatures were set to 110° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 8

TABLE 37

| | Components | Proportion (%) |
|---|---|---|
| Internal additional components | Lurasidone | 7.44 |
| | SOLUPLUS | 18.61 |
| | HPMCAS-HG | 18.60 |
| | Stearic acid | 2.35 |
| External additional components | Microcrystalline cellulose | 47.00 |
| | Crospovidone XL | 5.00 |
| | Magnesium stearate | 1.00 |
| | Total | 100.00 |

The internal additional components were weighed according to the prescription listed in table 37, these components were mixed uniformly and added into the feeder of a hot melt extruder, the module temperatures were set to 110° C., 130° C., 160° C., 160° C., 160° C., 160° C., 160° C., 155° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 9

TABLE 38

| | Components | Proportion (%) |
|---|---|---|
| Internal additional components | Lurasidone | 7.45 |
| | Copovidone VA64 | 11.17 |
| | HPMCAS-LF | 14.90 |
| | HPMCAS-MF | 11.18 |
| | Stearic acid | 2.35 |
| External additional components | Microcrystalline cellulose | 41.95 |
| | Crospovidone XL | 10.00 |
| | Magnesium stearate | 1.00 |
| | Total | 100.00 |

The internal additional components were weighed according to the prescription listed in table 38, these components were mixed uniformly and added into the feeder of a hot melt extruder, the module temperatures were set to 80° C., 130° C., 165° C., 165° C., 165° C., 165° C., 165° C., 160° C., the screw speed was set to 200 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

TABLE 39 dissolution in pH 6.0 medium

| Test number | 5 min | 10 min | 15 min | 20 min | 30 min | 45 min | 60 min |
|---|---|---|---|---|---|---|---|
| Reference formulation | 4 ± 0.81 | 5 ± 0.30 | 5 ± 0.19 | 5 ± 0.08 | 4 ± 0.06 | 4 ± 0.26 | 4 ± 0.07 |
| Example 9 | 52 ± 0.56 | 75 ± 0.82 | 80 ± 2.09 | 80 ± 3.11 | 78 ± 3.41 | 74 ± 4.62 | 70 ± 5.91 |

The solubilization effect of example 9 is stronger compared with the reference formulation in pH 6.0 medium, and the dissolution is more than 70% in 60 minutes.

Example 10

TABLE 40

| | Components | Proportion (%) |
|---|---|---|
| Internal additional components | Lurasidone | 7.44 |
| | SOLUPLUS | 26.05 |
| | HPMCAS-LF | 26.05 |
| | Stearic acid | 3.13 |
| External additional components | Lactose | 31.33 |
| | Crospovidone XL | 5.00 |
| | Magnesium stearate | 1.00 |
| | Total | 100.00 |

The internal additional components were weighed according to the prescription listed in table 40, these components were mixed uniformly and added into the feeder of a hot melt extruder, the module temperatures were set to 80° C., 115° C., 145° C., 145° C., 145° C., 145° C., 145° C., 140° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 11

TABLE 41

| | Components | Proportion (%) |
|---|---|---|
| Internal additional components | Lurasidone | 7.44 |
| | Copovidone VA64 | 7.44 |
| | HPMCAS-LF | 29.77 |
| | Stearic acid | 2.35 |
| External additional components | Anhydrous calcium hydrogen phosphorous | 47.00 |
| | Crospovidone XL | 5.00 |
| | Magnesium stearate | 1.00 |
| | Total | 100.00 |

The internal additional components were weighed according to the prescription listed in table 41, these components were mixed uniformly and added into the feeder of a hot melt extruder, the module temperatures were set to 80° C., 110° C., 145° C., 145° C., 145° C., 145° C., 145° C., 140° C., the screw speed was set to 50 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 12

TABLE 42

| | Components | Proportion (%) |
|---|---|---|
| Internal additional components | Lurasidone | 7.99 |
| | HPMCAS-MF | 31.96 |
| | Poloxamer 188 | 7.05 |
| External additional components | Microcrystalline cellulose | 47.00 |
| | Crospovidone XL | 5.00 |
| | Magnesium stearate | 1.00 |
| | Total | 100.00 |

The internal additional components were weighed according to the prescription listed in table 42, these components were mixed uniformly and added into the feeder of a hot melt extruder, the module temperatures were set to 80° C., 110° C., 155° C., 155° C., 155° C., 155° C., 155° C., 150° C., the screw speed was set to 100 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 13

TABLE 43

| Components | | Proportion (%) |
|---|---|---|
| Internal additional components | Lurasidone | 7.44 |
| | HPMCAS-LF | 18.61 |
| | HPMCAS-MF | 18.60 |
| | Stearic acid | 2.35 |
| External additional components | Microcrystalline cellulose | 47.00 |
| | Low-substituted hydroxypropyl cellulose | 5.00 |
| | Magnesium stearate | 1.00 |
| Total | | 100.00 |

The internal additional components were weighed according to the prescription listed in table 43, these components were mixed uniformly and added into the feeder of a hot melt extruder, the module temperatures were set to 80° C., 110° C., 145° C., 145° C., 145° C., 145° C., 145° C., 140° C., the screw speed was set to 100 rpm, and then the mixture was hot-melt extruded, the extrudate was cooled and broken to pieces, the crushed extrudate was passed through a 60 mesh screen, the external additional components were added according to the prescription, and the resulting mixture was blended and tableted.

Example 14

TABLE 44

| Components | | Proportion (%) |
|---|---|---|
| Internal additional components | Lurasidone | 2.26 |
| | Copovidone VA64 | 22.62 |
| | HPMCAS-MF | 22.62 |
| | Stearic acid | 2.50 |
| External additional components | Microcrystalline cellulose | 50.00 |
| Total | | 100.00 |

The internal additional components were weighed according to the prescription listed in table 44, wherein the weight ratio of lurasidone to HPMCAS was 1:10, which were mixed uniformly and added into the feeder of a hot melt extruder, the module temperatures were set to 110° C., 130° C., 160° C., 160° C., 160° C., 160° C., 160° C., 155° C., the screw speed was set to 100 rpm, and then the mixture was hot-melt extruded, the extrudate was cooled and broken to pieces, the crushed extrudate was passed through a 60 mesh screen, the external additional components were added according to the prescription, and the resulting mixture was blended.

TABLE 45

| | dissolution in pH 6.0 medium | | | | | | |
|---|---|---|---|---|---|---|---|
| Test number | 5 min | 10 min | 15 min | 20 min | 30 min | 45 min | 60 min |
| Reference formulation | 4 ± 0.81 | 5 ± 0.30 | 5 ± 0.19 | 5 ± 0.08 | 4 ± 0.06 | 4 ± 0.26 | 4 ± 0.07 |
| Example 14 | 63 ± 4.16 | 76 ± 4.56 | 77 ± 4.75 | 77 ± 5.05 | 77 ± 5.04 | 77 ± 4.91 | 76 ± 4.76 |

The solubilization effect of example 14 is stronger compared with the reference formulation in pH 6.0 medium, and the dissolution is more than 70% in 60 minutes.

Example 15

In this example, the hot-melt powders prepared by prescription 12 and 9 are taken as examples for XRD detection. The instrument used is X-ray powder diffractometer. The manufacturer of the instrument is Panaco, Netherlands. The model is sharp shadow. The parameters of the instrument are shown in Table 46.

TABLE 46

| Items | Parameters |
|---|---|
| X-ray | Cu, kα, kα1 (å): 1.540598; kα2 (å): 1.544426; kα2/kα1 intensity ratio: 0.50 |
| X-ray tube setting | 45 kv, 40 ma |
| Divergence slit | Automatic, irradiated length = 10.0 mm |
| Emit anti-scattering slit | 1° |
| Receive anti-scattering slit | 6.6 mm |
| Monochromator | No |
| Scanning mode | Reflection mode |
| Sample holder | Monocrystalline silicon |
| Scanning mode | Continuous |
| Scanning scope (°2th) | 3°~40° |
| Scanning step (°2th) | 0.0167° |
| Scanning speed s/step | 10 |

An appropriate amount of the sample was took and putted into the circular frame of a sample holder with zero background, pressing it lightly with slide to get a flat plane, and fixing it with the sample holder with zero background. After the instrumentation ran steadily, scanning was performed once according to the detection conditions shown in Table 46, and the atlas were recorded. Prescription 12, prescription 9 and comparative example 12 were detected respectively. The specific detection results were shown in FIGS. 1 to 3.

Figure 2:
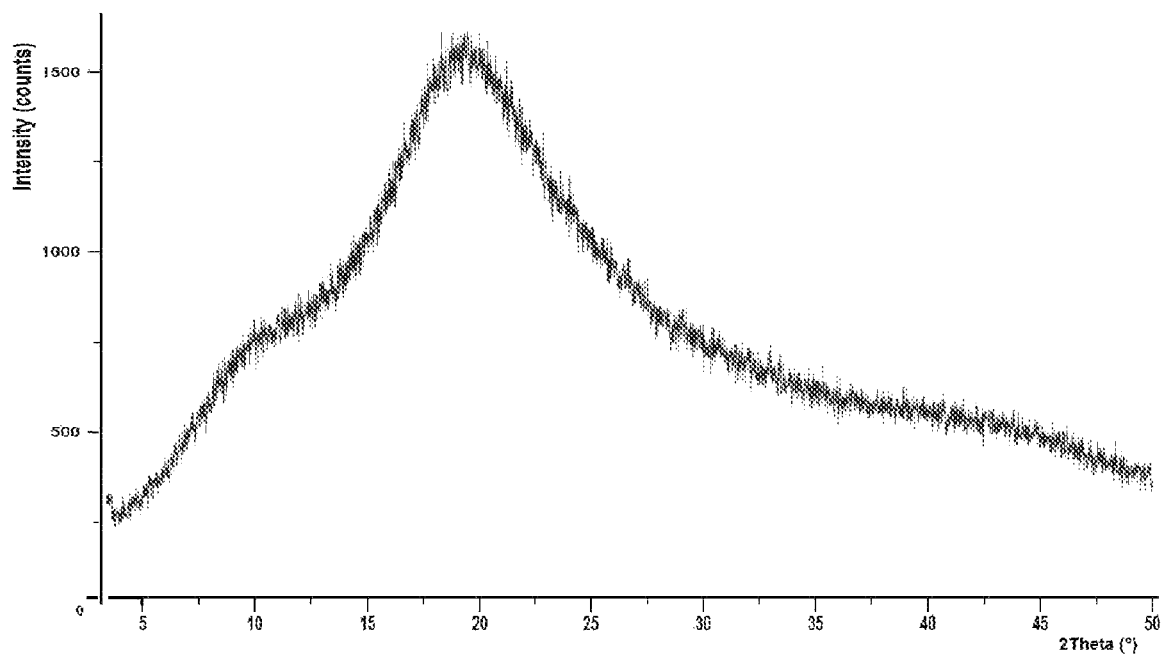
FIG. 2 shows the XRD test results of the hot melt powder of example 15 of the present invention.

It can be seen from FIGS. 1 to 2 that the hot melt powder prepared in prescription 12 and 9 is amorphous.

Figure 3:
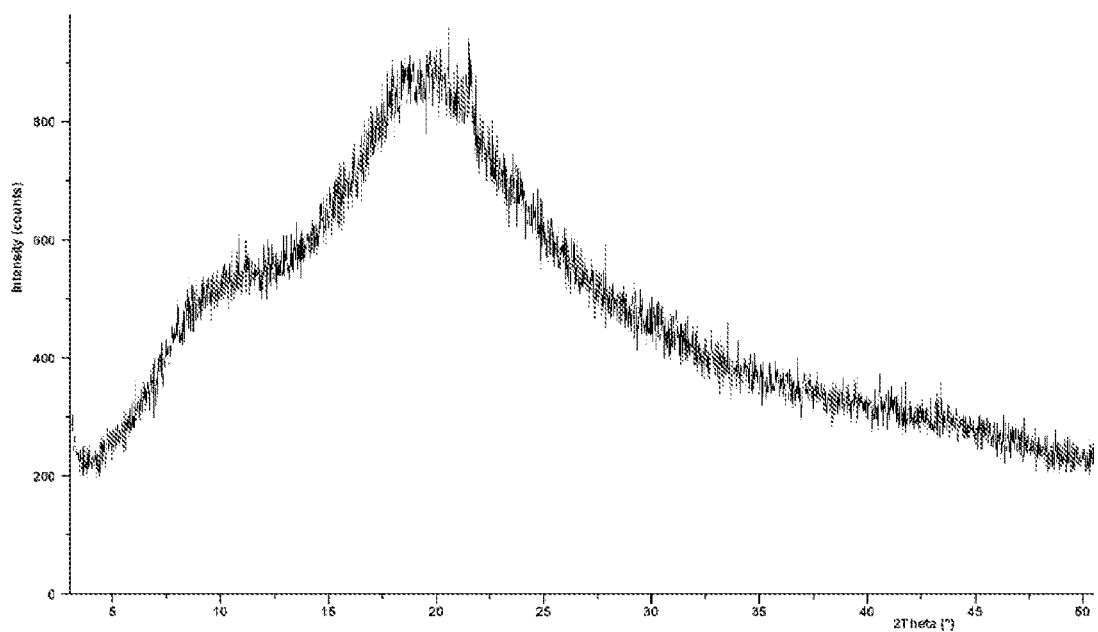
FIG. 3 shows the XRD test results of the hot melt powder of example 15 of the present invention.

It can be seen from FIG. 3 that the spray dried powder prepared in comparative example 12 is amorphous solid dispersion.

Example 16 Pharmacokinetic tests

The pharmacokinetics of tablets prepared by reference formulation (RLD), prescription 12 (Sample 1), prescription 9 (Sample 2) and prescription 5 (Sample 3) were tested in Beagle dogs, 3 dogs in each group, the effects of food on the pharmacokinetics of tablets were investigated in fasting and feeding conditions. The content of lurasidone in Beagle Dog plasma was detected by LC-MS-MS, the pharmacokinetic parameters were calculated using a noncompartmental method by WinNonLin 6.3 software. The results were shown in table 47:

TABLE 47

Pharmacokinetic parameters

| | Peak time $T_{max}$ (hour) | Peak concentration $C_{max}$ (ng/ml) | 0-∞ area under the curve $Auc_{inf}$ (hour*ng/ml) |
|---|---|---|---|
| RLD Fasting | 0.92 ± 0.95 | 57.3 ± 43 | 127 ± 72 |
| RLD Feeding | 3.67 ± 5.5 | 125 ± 90 | 340 ± 59 |
| Sample 1 Fasting | 0.5 ± 0 | 236 ± 120 | 423.65 ± 196.2 |
| Sample 1 Feeding | 1.33 ± 0.58 | 215.67 ± 95.08 | 571.74 ± 193.53 |
| Sample 2 Fasting | 0.5 ± 0 | 394 ± 98.73 | 666.47 ± 154.61 |
| Sample 2 Feeding | 0.83 ± 0.29 | 313.67 ± 95.11 | 689.46 ± 171.34 |
| Sample 3 Fasting | 0.67 ± 0.29 | 272.8 ± 181.08 | 596.21 ± 426.19 |
| Sample 3 Feeding | 1.5 ± 0.87 | 345 ± 259.93 | 815.39 ± 119.91 |

Figure 4:
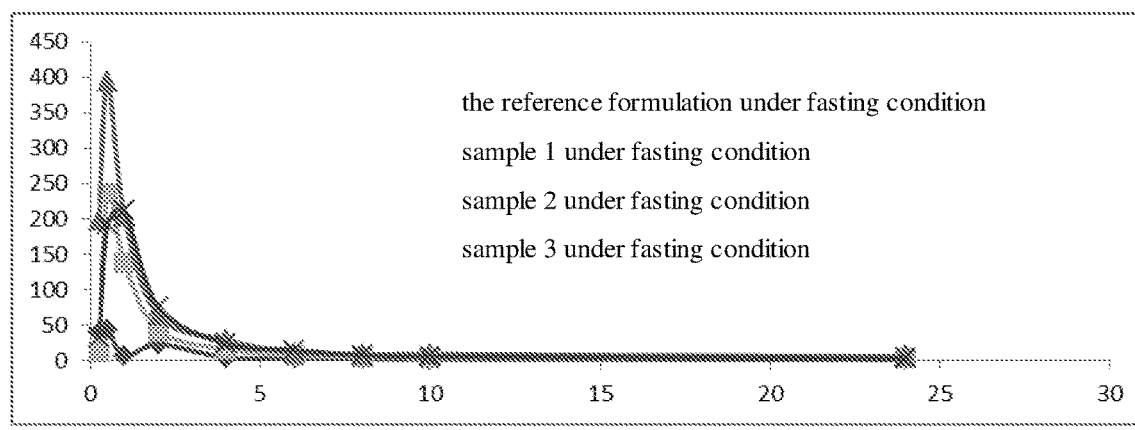
FIG. 4 shows the concentration-time curve of the reference formulation, sample 1, sample 2 and sample 3 under fasting condition.
Figure 5:
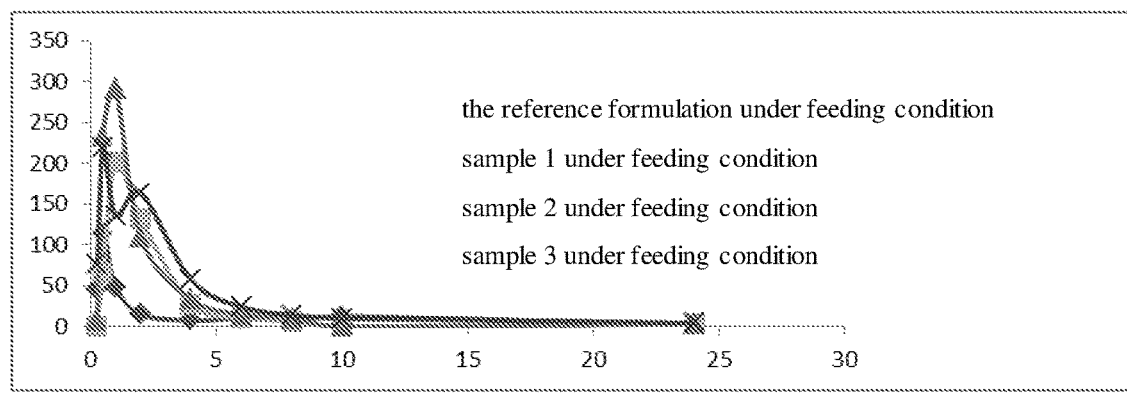
FIG. 5 shows the drug concentration-time curve of the reference formulation, sample 1, sample 2 and sample 3 under feeding condition.

As can be seen from the table above, the AUC and Cmax of the reference formulation under fasting condition of Beagle dogs were significantly different from that under feeding condition. The AUC under feeding condition was 2.68 times as much as that under fasting condition, and the Cmax under feeding condition was 2.18 times as much as that under fasting condition. Food effect is more significant. The AUCinf of sample 1 under feeding condition was 1.35 times as high as that under fasting condition, and the Cmax thereof under feeding condition was slightly lower than that under fasting condition, and the bioavailability thereof was higher than that of the reference formulation; the AUCinf of sample 2 under feeding condition was 1.04 times as high as that under fasting condition, and the Cmax thereof was lower than that under fasting condition, and the bioavailability thereof was also higher than that of the reference formulation; the AUCinf of sample 3 under feeding condition was 1.37 times as high as under fasting condition, the bioavailability thereof was higher than that of the reference formulation. The specific drug concentration-time curves are shown in FIG. 4 and FIG. 5. The food effects of this three groups of examples are significantly reduced.

In summary, the lurasidone composition provided herein is advantageous for the absorption of lurasidone, and can ensure the increase of the dissolution of lurasidone in small intestine without considering the effect of food on the absorption of lurasidone, thus the excessive medication restriction was reduced, the reduction or even inefficiency of the curative effect caused by improper medication was avoided, and the normal development of the medication effect was ensured, thereby the flexibility and compliance of patients in taking drugs were increased.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A lurasidone solid dispersion consisting of:
   lurasidone in a free base form;
   hydroxypropyl methylcellulose succinate acetate; and
   stearic acid; and
   another carrier;
   wherein:
   the another carrier is copovidone or polyvinyl caprolactam-polyvinyl acetate-polyethylene glycol graft copolymer;
   the lurasidone and the hydroxypropyl methylcellulose succinate acetate have a weight ratio ranging from about 1:1 to about 1:4;
   the lurasidone and the another carrier have a weight ratio ranging from about 1:1 to about 1:4; and
   the lurasidone and the stearic acid have a weight ratio ranging from about 1:0.1 to about 1:0.42.

2. The lurasidone solid dispersion of claim 1, wherein the lurasidone solid dispersion is prepared by a melting method.

3. The lurasidone solid dispersion according to claim 1, wherein the carrier component consists of:
   hydroxypropyl methylcellulose succinate acetate; and
   polyvinyl caprolactam-polyvinyl acetate-polyethylene glycol graft copolymer.

4. The lurasidone solid dispersion according to claim 1, wherein the carrier component consists of hydroxypropyl methylcellulose succinate acetate and copovidone.

5. A method of preparing the lurasidone solid dispersion of claim 1, the method comprising:
   melting a mixture of the lurasidone, the carrier component and the stearic acid to obtain the lurasidone solid dispersion.

6. The method of claim 5, wherein the melting is carried out under a temperature from 80° C. to 200° C. and a screw speed from 30 to 1000 rpm.

7. A pharmaceutical composition comprising:
   the lurasidone solid dispersion of claim 1; and
   optionally, a pharmaceutically acceptable excipient comprising at least one selected from:
   a filler comprising at least one selected from lactose, starch, microcrystalline cellulose, silicified microcrystalline cellulose, powdered cellulose, mannitol, dextrin, pre-gelatinized starch, corn starch, sorbitol, calcium sulfate, calcium hydrogen phosphorous and calcium carbonate;
   a disintegrant comprising at least one selected from crospovidone, croscarmellose sodium, sodium carboxymethyl starch, dry starch, low-substituted hydroxypropyl cellulose, microcrystalline cellulose and modified corn starch;
   a binder comprising at least one selected from starch, pre-gelatinized starch, sodium carboxymethylcellulose, hydroxypropyl cellulose, methyl cellulose, ethyl cellulose, hydroxypropylmethylcellulose, sucrose, gelatin, polyvinylpyrrolidone, microcrystalline cellulose and copovidone;
   a surfactant comprising at least one selected from sodium lauryl sulfate, quaternary ammonium compound, lecithin, fatty acid glycerides, sorbitan fatty acid ester and polysorbate;
a flavouring agent comprising at least one selected from sucrose, sucralose, acesulfame, aspartame, stevioside, saccharin sodium and cyclamate; and
a lubricant comprising at least one selected from magnesium stearate, micropowder silicagel, stearic acid, talcum, glyceryl behenate, hydrogenated vegetable oil, wax, mineral oil, sodium stearyl fumarate and polyethylene glycol;
wherein the pharmaceutical composition is optionally in a form of granule, tablet, capsule or enteric formulation.

8. A combination used for treatment of a psychosis, the combination comprising:
a first active ingredient comprising lurasidone in a form of the lurasidone solid dispersion as defined in claim 1; and
a second active ingredient comprising a drug other than lurasidone that is used for treating a psychosis.

9. The combination of claim 8, wherein the psychosis is at least one of schizophrenia, bipolar depression and autism.

10. A method of treating at least one of schizophrenia, bipolar depression and autism in a patient in need thereof, the method comprising:
administering an effective amount of the combination of claim 8 to the patient.

11. A method of treating a psychosis in a patient in need thereof, the method comprising:
administering an effective amount of the combination of claim 8 to the patient.

12. A lurasidone solid dispersion comprising:
lurasidone in a free base form;
a carrier component consisting of:
hydroxypropyl methylcellulose succinate acetate; and
at least one carrier selected from copovidone and polyvinyl caprolactam-polyvinyl acetate-polyethylene glycol graft copolymer; and
a plasticizer comprising at least one selected from poloxamer, propanediol, stearic acid, polyethylene glycol, tocopherol polyethylene glycol succinate, caprylocaproyl macrogolglyceride, triethyl citrate, diethyl phthalate and glycerin monostearate,
wherein:
the lurasidone and the hydroxypropyl methylcellulose succinate acetate have a weight ratio ranging from about 1:1 to about 1:30;
the lurasidone and the at least one carrier other than hydroxypropyl methylcellulose succinate acetate have a weight ratio ranging from about 1:1 to about 1:30; and
the lurasidone and the plasticizer have a weight ratio ranging from about 1:0.1 to about 1:6.

13. The lurasidone solid dispersion of claim 12, wherein the lurasidone and the plasticizer have a weight ratio ranging from about 1:0.1 to about 1:1.62.

14. The lurasidone solid dispersion according to claim 12, wherein the carrier component consists of:
hydroxypropyl methylcellulose succinate acetate; and
polyvinyl caprolactam-polyvinyl acetate-polyethylene glycol graft copolymer.

15. The lurasidone solid dispersion according to claim 12, wherein the carrier component consists of hydroxypropyl methylcellulose succinate acetate and copovidone.

16. A lurasidone solid dispersion comprising:
lurasidone in a free base form;
a carrier component consisting of:
hydroxypropyl methylcellulose succinate acetate; and
at least one carrier selected from copovidone and polyvinyl caprolactam-polyvinyl acetate-polyethylene glycol graft copolymer; and
a plasticizer component comprising stearic acid,
wherein:
the lurasidone and the hydroxypropyl methylcellulose succinate acetate have a weight ratio ranging from about 1:1 to about 1:4;
the lurasidone and the at least one carrier other than hydroxypropyl methylcellulose succinate acetate have a weight ratio ranging from about 1:1 to about 1:4; and
the lurasidone and the plasticizer have a weight ratio ranging from about 1:0.1 to about 1:0.42.

* * * * *